Jan. 4, 1938.    G. W. RAWLINGS    2,104,707
ELECTRIC GENERATOR
Filed May 1, 1937

Inventor
G. W. Rawlings
By his Attorney: Walter Gunn

UNITED STATES PATENT OFFICE 2,104,707

ELECTRIC GENERATOR

George William Rawlings, Park Hill, Kenilworth, England

Application May 1, 1937, Serial No. 140,161
In Great Britain November 26, 1935

8 Claims. (Cl. 171—209)

This invention has reference to improvements in electric generators and is concerned more particularly with electric generators of the type wherein the magnetic field is created by a permanent magnet and which are required for generating current for lighting purposes.

With electric generators for use on cycles hereinbefore in use, it has been necessary in order to obtain the desired output and steadiness of light for the rotor of the generator to be rotated at a considerably greater speed than the wheels of the cycle. Where the generator has been built into the hub of the wheel this has involved the use of gearing.

The present invention has for its object, an improved electric generator for the hub of a cycle wheel and having an improved construction and arrangement of parts, which gives a steady light even at slow speeds but which is only driven at the same speed as the cycle wheels.

The invention consists of an improved electric generator of the kind hereinbefore referred to comprising in combination a multi-polar annular permanent magnet mounted within the wheel hub and rotatable therewith and a wound multi-polar stator fixed to the hub spindle and disposed within the aperture of the annular magnet thus providing a generator in which all the rotating parts are fixed relatively to the rotating parts of the hub and all the stationary parts are fixed relatively to the hub spindle.

The invention still further resides in the details of the improved electric generator to be described hereinafter.

In the accompanying drawing:—

As illustrated, $a$ is the wheel spindle on which is mounted in the usual manner a fixed ball race $b$ and adjustable ball race $c$. The wheel hub comprises the main shell $d$ having the usual complementary ball races and flanges $e$ and $f$, the former being drilled for spoke heads while to the latter is secured a secondary shell $g$ of larger diameter with a peripheral flange $g^1$ also drilled for spoke heads. This secondary shell is located by a shoulder $g^2$ concentric with the ball races of the main shell $d$.

Within the enlarged portion of the hub thus formed at one end is fixed a permanent magnet $h$, secured by bolts $h^1$ and it will be noted that the secondary shell part $g$ which is preferably of relatively non-magnetic material, is slightly dished for increased rigidity as it has to bear the running load of the cycle and the initial tension of the spokes attached to it. This dishing also gives additional clearance for the rivets $g^3$. The magnet may conveniently have 20 deep poles $h^2$ and measure about 4¼ inches diameter by ¾ inch width and secured to it is a dust cover $h^3$ also preferably of non-magnetic material. In order to obtain good magnetic efficiency and strength with such close spacing of the poles, the permanent magnet will preferably be of a material of high coercivity, such as one of the recently developed nickel aluminium alloys or one of the cobalt magnet steels. Dust excluders and lubricant retainers $i$ are provided for the ball races.

Figure 1:
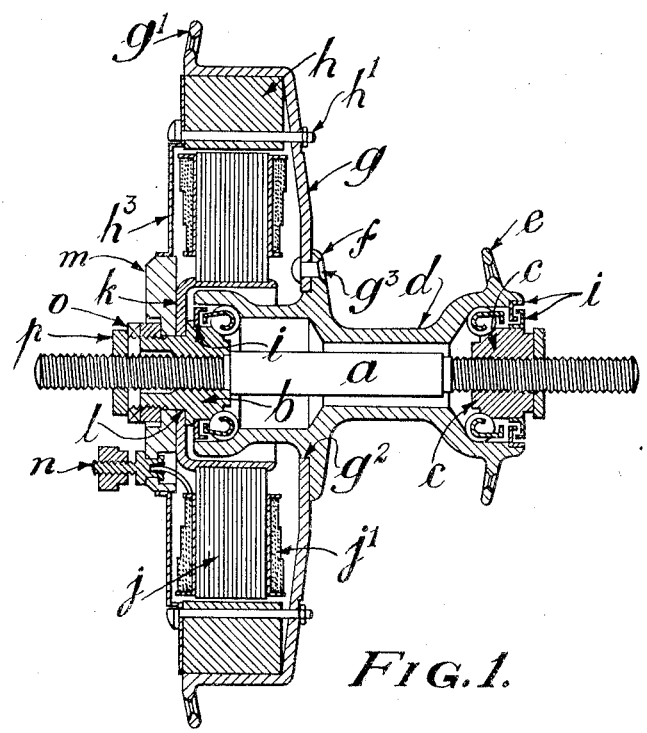
Fig. 1 is a sectional elevation of one example of generator made in accordance with the invention and built into a cycle wheel hub.
Figure 2:
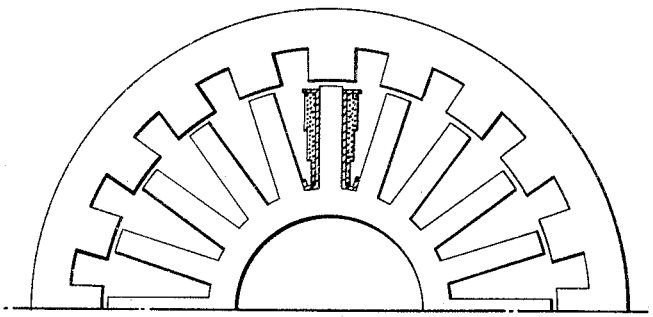
Fig. 2 is an end elevation showing only half of the rotary permanent magnet and half of the stator with one winding in section.

The stator comprises an assembly of multi-polar laminations or stampings $j$ secured to a cup-shaped bracket $k$ by shoulders, the last of which is formed by pressing or other method to secure the laminations, such cup-shaped bracket fitting on and against a shoulder $l$ formed on the ball race $b$. The electric winding $j^1$ is of stepped form so as to accommodate, relative to the space available between the stator poles, the maximum possible size of electric winding, one only of which is shown in Fig. 2. On the shoulder $l$ of the ball race $b$ is also mounted a disc $m$ of insulating material carrying an electric terminal $n$. The disc $m$ and bracket $k$ are secured to the fixed ball race by a nut $o$ screwing on to the end of the fixed ball race and in turn such nut and the ball race are secured by a locking nut $p$ on the wheel spindle.

The winding of the stator is connected to the terminal $n$ at one end and to the bracket $k$ at its other end for an earth return circuit through the cycle frame. The stator may be about 3½ inches diameter and has the same number of poles (20) as the rotary magnet.

It is found that an electric generator constructed as hereinbefore described although running at a slow speed generates a current having a frequency which gives a steady light even at low speeds.

In addition the compactness of the construction readily enables the generator to be built into the hub of a wheel.

It is to be particularly noted that all the rotary parts of the generator are fixed to the rotary part of the wheel hub while the stator is fixed to the relatively stationary spindle of the wheel hub. The moving parts of the generator neither have nor require any bearings separate from the wheel hub bearings and no commutator or other form of electrical collector is required. Also, it is to be seen that the stator is mounted in a shoulder on the ball race which will of course be machined concentric with the ball race while the permanent magnet is similarly located by a concentric shoulder on the hub, so that errors of eccentricity between the ball race and the spindle have substantially no effect on the relative concentricity of the stator and rotor and the stator may be accurately located in the tunnel of the permanent magnet and the air gap is reduced to a minimum.

What I claim is:—

1. An electric generator for a cycle comprising an annular member fixed to the cycle wheel hub and having a plurality of inwardly directed permanently magnetized poles and a wound multi-polar armature within the annular member and fixed to the cycle wheel spindle.

2. An electric generator for a cycle comprising an annular member fixed to the cycle wheel hub and having a plurality of inwardly directed permanently magnetized poles and a wound multi-polar armature within the annular member and fixed to the cycle wheel spindle, the annular member being located and housed in a shell-like part concentrically located on and secured to the wheel hub proper.

3. An electric generator for a cycle comprising an annular member fixed to the cycle wheel hub and having a plurality of inwardly directed permanently magnetized poles and a wound multi-polar armature within the annular member and fixed to the cycle wheel spindle, the annular member being located and housed in a shell-like part concentrically located on and secured to the wheel hub proper, said shell-like part having a flange formed to receive some of the wheel spokes.

4. An electric generator for a cycle comprising an annular member fixed to the cycle wheel hub and having a plurality of inwardly directed permanently magnetized poles, ball bearings supporting the hub on a spindle, and a wound multi-polar armature within the annular member and non-rotatably and concentrically secured to a part of a ball bearing fixed on the spindle.

5. An electric generator for a cycle comprising an annular member fixed to the cycle wheel hub and having a plurality of inwardly directed permanently magnetized poles, ball bearings supporting the hub on a spindle and a wound multi-polar armature within the annular member and non-rotatably and concentrically secured to a part of a ball bearing fixed on the spindle, the annular member being located and housed in a shell-like part concentrically located on and secured to the wheel hub proper.

6. An electric generator for a cycle comprising an annular member fixed to the cycle wheel hub and having a plurality of inwardly directed permanently magnetized poles, ball bearings supporting the hub on a spindle, and a wound multi-polar armature within the annular member and non-rotatably and concentrically secured to a part of a ball bearing fixed on the spindle, the annular member being located and housed in a shell-like part concentrically located on and secured to the wheel hub proper, said shell-like part having a flange formed to receive some of the wheel spokes.

7. An electric generator for a cycle comprising an annular member fixed to the cycle wheel hub and having a plurality of inwardly directed permanently magnetized poles and a wound multi-polar armature within the annular member and fixed to the cycle wheel spindle, the windings on the armature being stepped proportional to the inclination of adjacent windings so as to accommodate the maximum possible size of windings in the space available between the armature poles.

8. An electric generator for a cycle comprising an annular member fixed to the cycle wheel hub and having a plurality of inwardly directed permanently magnetized poles, ball bearings supporting the hub on a spindle, and a wound multi-polar armature within the annular member and non-rotatably and concentrically secured to a part of a ball bearing fixed on the spindle, the annular member being located and housed in a shell-like part concentrically located on and secured to the wheel hub proper, said shell-like part having a flange formed to receive some of the wheel spokes, and the windings on the armature being stepped proportional to the inclination of adjacent windings so as to accommodate the maximum possible size of windings in the space available between the armature poles.

GEORGE W. RAWLINGS.